United States Patent [19]

Saldanha et al.

[11] Patent Number: 5,649,166
[45] Date of Patent: Jul. 15, 1997

[54] DOMINATOR SELECTION METHOD FOR REDUCING POWER CONSUMPTION IN A CIRCUIT

[75] Inventors: Alexander Saldanha, El Cerrito; Patrick McGeer, Orinda, both of Calif.

[73] Assignee: Cadence Design Systems, Inc., San Jose, Calif.

[21] Appl. No.: 427,051

[22] Filed: Apr. 24, 1995

[51] Int. Cl.⁶ .................................................. G06F 17/50
[52] U.S. Cl. ........................ 395/500; 364/488; 364/491; 364/578
[58] Field of Search .......................... 395/500; 364/488, 364/489, 491, 578, 492, 707; 326/38, 33, 94; 365/227, 230.08

[56] References Cited

U.S. PATENT DOCUMENTS

| | | | |
|---|---|---|---|
| 5,243,538 | 9/1993 | Okuzawa et al. | 364/489 |
| 5,377,201 | 12/1994 | Chakradhar et al. | 371/23 |
| 5,396,425 | 3/1995 | Ginetti | 364/489 |
| 5,396,435 | 3/1995 | Ginetti | 364/489 |
| 5,461,574 | 10/1995 | Matsunaga et al. | 364/489 |
| 5,469,367 | 11/1995 | Puri et al. | 364/489 |

OTHER PUBLICATIONS

Chen et al., "A Complement–Based Fast Algorithm to Generate Universal Test Sets for Combinational Function Blocks", IEEE 1992, pp. 76–81.

Chen et al., "A Complement–Based Fast Algorithm to Generate Universal Test Sets for Multi–Output Functions," IEEE 1994, pp. 370–377.

Falkowski et al., "Efficient Algorithms for the Calculation of Arithmetic Spectrum from OBDD and Synthesis of OBDD from Arithmetic Spectrum for Incompletely Specified Boolean Functions", IEEE 1994, pp. 197–200.

Alred V. Aho, John E. Hopcroft, and Jeffrey D. Ullman, "The Design and Analysis of Computer Algorithms", Addison–Wesley Computer Science, 1974, pp. 172–217.

A. P. Chandrakasan et al., "Hyper–LP: A System For Power Minimization Using Architectural Transformation," Nov. 1992, *Proceedings of the International Conference on Computer Design*, pp. 300–303 (Nov. 1992).

A. Shen et al., "On Average Power Dissipation and Random Pattern Testability of CMOS Combinational Logic Circuits," Nov. 1992, *Proceedings of the International Conference on Computer Design*, pp. 402–407 (Nov. 1992).

R. Murai et al., "Decomposition for Minimum Transition Activity," Apr. 1994, *Proceedings of the Low–Power Workshop*, pp. 1–10.

V. Tiwari et al., "Technology Mapping for Low Power," Jun. 1993, *Proceedings of the 30th ACM/IEEE Design Automation Conference*, pp. 74–79.

C. Y. Tsui et al., "Technology Decomposition and Mapping Targeting Low Power Dissipation," Jun. 1993, *Proceedings of 30th ACM/IEEE Design Automation Conference*, pp. 68–73.

L. Benini and G. De Micheli, "State Assignment for Low Power Dissipation," 1994, *Proceedings of EDAC'94* (Month Not Available).

(List continued on next page.)

*Primary Examiner*—Kevin J. Teska
*Assistant Examiner*—Tan Nguyen
*Attorney, Agent, or Firm*—Townsend and Townsend and Crew LLP

[57] ABSTRACT

A method for reducing power consumed in a circuit, the circuit having at least a first and a second primary input lead, a plurality of gates, and a plurality of edges, includes the steps of: determining a dominator edge and dominated gates in the circuit, the dominated gates coupled to the first primary input lead and to edges of the plurality of edges dominated by the dominator edge; providing a dominator selector circuit to the circuit; coupling the dominator selector circuit to the dominator edge and to the first primary input lead; uncoupling the dominated gates from the first primary input lead; and coupling the dominated gates to the dominator selector circuit.

27 Claims, 6 Drawing Sheets

OTHER PUBLICATIONS

M. Alidina et al., "Precomputation–Based Sequential Logic Optimization for Low Power," 1994, *Proceedings of the International Conference on Computer–Aided Design*, pp. 74–81 (Nov. 1994).

Randal Bryant, "Graph–Based Algorithms for Boolean Function Manipulation," 1986, Aug. *IEEE Transactions on Computers*, vol. C–35, No. 8, pp. 677–691.

D. A. Huffman, "A Method for the Construction of Minimum Redundancy Codes," Sep. 1952, *Proceedings of the IRE*, vol. 40 pp. 1098–1101.

A. V. Aho et al., "Algorithms on Graphs", 1974, *The Design and Analysis of Computer Algorithms*, Chapter 5, pp. 171–223., 1974.

G. D. Hachtel et al. "Re–encoding Sequential Circuits to Reduce Power Dissipation," Nov. 1994, *Proceedings of the International Conference on Computer–Aided Design*, pp. 70–73.

DOMINATOR SELECTION METHOD FOR REDUCING POWER CONSUMPTION IN A CIRCUIT

FIELD OF THE INVENTION

The present invention relates to methods for synthesizing gate level digital circuits and the circuits derived therefrom and, in particular, methods for reducing the power consumed by the charging of inputs into a digital circuit

BACKGROUND OF THE INVENTION

With the advent of battery operated computers and hand held digital electronic devices, circuit designers have become more conscious of the need to reduce power consumed by the integrated circuits (ICs) used in their designs.

Various techniques for reducing the power consumed in electronic circuits have been applied at all levels of design. For a survey of generally applicable techniques, attention is directed to "Hyper-LP: A System For Power Minimization Using Architectural Transformations", by A. P. Chandrakasan, M. Potkonjak, J. Rabaey, and R. W. Broderson, *Proceedings of the International Conference on Computer-Aided Design*, pp.300–303, (November 1992), [IEEE 0-8186-3010-8/92].

Logic-Optimization techniques modify well known algorithms for logic optimization such as node simplification and partial collapsing, which are well known in the art. Other works of interest are "On Average Power Dissipation and Random Pattern Testability of CMOS Combinational Logic Circuits", by A. Shen, A. Ghosh, S. Devadas, and K. Keutzer, *Proceedings of the International Conference on Computer-Aided Design*, pp. 402–407, (November 1992), [IEEE 0-8186-3010-8/92], discussing the logic-optimization technique of disjoint cover realization; "Decomposition for Minimum Transition Activity", by R. Murgai, R. K. Brayton, and A. Sangiovanni-Vincentelli, *Proceedings of the Low-Power Workshop*, pp. 1–10, Napa, Calif., (April 1994) [Dept. EECS, Univ. of Cal. Berkeley], discussing the technique of node decomposition; and "Technology Mapping for Low Power", by V. Tiwari, P. Ashar, and S. Malik, *Proceedings of the 30th ACM/IEEE Design Automation Conference*, pp. 74–79, (June 1993), [ACM 0-89791-577-1/93/0006-0074], and in "Technology Decomposition and Mapping Targeting Low Power Dissipation", by C. Y. Tsui, M. Pedram, and A. M. Despain, *Proceedings of the 30th ACM/IEEE Design Automation Conference*, pp. 68–73, (June 1993), [ACM 0-89791-577-1/93/0006/0068], both discussing technology mapping to obtain circuits with reduced switching activity.

A problem with logic-optimization techniques is that circuit switching time and propagation delays are often not accounted for in these standard logic optimization algorithms. All of the above techniques are based on a zero-delay model, where only the final stable value on each gate is considered. It remains unclear whether results obtained using the above techniques are related to the actual power consumed in the circuit. As a result, none of these techniques have reported results with an actual significant power reduction.

The State-Encoding approach is based on the observation that a sizable fraction of logic in most circuits is devoted to computing the next state function, as discussed in "State Assignment for Low Power Dissipation", by L. Benini, G. DeMicheli, *Proceedings of EDAC'94*, (1994). As a result, it is reasoned that if neighboring states in the state transition graph differ in very few bits, few transitions will be required on most input-vector changes. Re-encoding of sequential logic circuits to minimize transition activity is described in the paper, "Re-encoding Sequential Circuits to Reduce Power Dissipation", by G. D. Hachtel, M. Hermida, A. Pardo, M. Poncino, and F. Somenzi, *Proceedings of the International Conference on Computer-Aided Design*, pp. 70–73, (November 1994), [ACM 0-89791-690-5/94/0011/0070]. A basic problem with state-encoding approaches is that it is often difficult to make strong statements about the transition activity in a circuit when the input-output function and the state code is known but the actual implementation of the Combinational logic circuit is not yet known. This is not to say that this technique cannot be usefully applied in conjunction with the techniques disclosed and claimed herein.

The Pre-Computation technique attempts to reduce power consumption by selectively pre-computing some of the output logic values one clock cycle in advance. The pre-computed values are then used to reduce the transition activity in the next clock cycle. While a few pre-computation architectures have been explored, for instance, "Precomputation-Based Sequential Logic Optimization for Low Power", by M. Alidina, J. Monteiro, S. Devadas, A. Ghosh, and M. Papaefthymiou, *Proceedings of the International Conference on Computer-Aided Design*, pp. 74–81, (November 1994), [ACM 0-89791-690-5/94/0011/0074], it appears that for effective power reduction a specific pre-computation architecture must be designed for each circuit class. The technique appears to be more effective on data path circuits with a regular logic structure, e.g., arithmetic. However, the technique is not as effective on control circuits that do not have regular logic structures, also called random logic.

A general objection to these approaches is that it is often difficult to estimate either a peak or an average power consumption of a circuit, which are complex functions of both the logical and timing properties of the circuit. Given a delay model based upon timing properties, efficiently determining the logical behavior of circuits over time, under all possible input vectors is a very difficult problem. Thus, one is often forced to rely on timing simulation. However, there is neither a guarantee that the set of input test vectors chosen for simulation is representative of the whole input space nor that the set of input test vectors contains the worst-case vector.

FIG. 1a and 1b illustrate typical Shannon graphs. The Shannon graph in FIG. 1a includes a set of nodes, also called switching nodes, each having one or more input edges and two output edges. In the example, the Shannon graph labeled f, 20, has a root node 10 labeled $X_1$ and output edges 30 and 40, labeled $x_1$ and $x_{,\cdot 1}$, respectively. Note: x' as used herein is equivalent to $\bar{x}$, the logical complement to x.

A drawback with current circuits is that certain nodes in a circuit may not affect the eventual output state of the circuit. This drawback is illustrated below in the following example. In this example, three nodes are labeled A, B and C, having input states denoted X, Y and Z:

A=X AND Y

B=Z AND Y

C=A OR B

In the case where X=0, Y=1 and Z=1, the output state of A, B and C are as follows: A=0, B=1 and C=1. Now if the input states changes from X=0, Y=1 and Z=1 to X=1, Y=1 and Z=1, assuming a unit delay, node A changes from 0 to 1, node B remains at 1, and node C remains at 1. Since the output for B did not change, the output state of C was independent of the value of A. The final state of A was not needed to determine the correct output of the circuit with respect to node C, because the result of the transition of A from 0 to 1 did not propagate to the node C. Because node A switched without having an impact on node C, the power consumed by the switching of A could have been saved. In larger circuits containing even greater number of nodes in multiple pathways, many transitions do not eventually propagate to the output. Thus, eliminating those components whose transitions do not propagate to the output in a circuit is important.

What is needed in this art is a method for deriving a low power circuit from a Shannon graph. Since transitions depend not only upon logical properties, but also upon timing properties of circuit components, it is desirable in this art to reduce the number of 0 to 1 transitions on switching nodes. In a circuit derived from a Shannon graph, most of the power consumed is due to the charging of gate inputs by primary inputs leads, i.e. input capacitance. Reducing the amount of input capacitance on the primary input leads is thus important.

SUMMARY OF THE INVENTION

The present invention provides a method for reducing power consumption of charging inputs in low-power digital circuits, a circuit derived therefrom, and an apparatus for reducing power consumption.

According to one embodiment of the invention, a method for reducing power consumed in a circuit, the circuit having at least a first and a second primary input lead, a plurality of gates, and a plurality of edges, includes the steps of: determining a dominator edge and dominated gates in the circuit, the dominated gates coupled to the first primary input lead and to edges of the plurality of edges dominated by the dominator edge; providing a dominator selector circuit to the circuit; coupling the dominator selector circuit to the dominator edge and to the first primary input lead; uncoupling the dominated gates from the first primary input lead; and coupling the dominated gates to the dominator selector circuit.

According to another embodiment of the invention a method for reducing power consumed in a circuit, the circuit having at least a first and a second primary input lead, a plurality of gates, and a plurality of edges, includes the steps of: determining a first dominator edge and a first set of dominated gates in the circuit, the first set of dominated gates coupled to the first primary input lead and to a first set edges of the plurality of edges dominated by the dominator edge; determining a second dominator edge and a second set of dominated gates in the circuit, the second set of dominated gates coupled to the first primary input lead and to a second set of edges of the plurality of edges dominated by the dominator edge; determining a third set of dominated gates, the fourth set of dominated gates including gates dominated by only the first dominator edge; determining a fourth set of dominated gates, the fourth set of dominated gates including gates dominated by the first dominator edge and the second dominator edge; providing a first dominator selector circuit to the circuit; providing a second dominator selector circuit to the circuit; coupling the first dominator selector circuit to the first dominator edge and to the first primary input lead; coupling the second dominator selector circuit to the second dominator edge and to the first dominator selector circuit; uncoupling the primary input lead from the first set of dominated gates; coupling the third set of dominated gates to the first dominator selector circuit; and coupling the fourth set of dominated gates to the second dominator selector circuit.

According to another embodiment of the invention a system for reducing power consumed in a circuit, the circuit having at least a first and a second primary input lead, a plurality of gates, and a plurality of edges, the system including a processor and a memory, the system further includes: an input device, coupled to the memory for inputting the Shannon graph into the memory; means, coupled to the memory for determining a dominator edge and dominated gates in the circuit, the dominated gates coupled to the first primary input lead and to edges of the plurality of edges dominated by the dominator edge; means, coupled to the memory for providing a dominator selector circuit to the circuit; means, coupled to the memory for coupling the dominator selector circuit to the dominator edge and to the first primary input lead; means, coupled to the memory for uncoupling the dominated gates from the first primary input lead; means, coupled to the memory for coupling the dominated gates to the dominator selector circuit; and an output device, coupled to the processor and to the memory for outputting the circuit.

BRIEF DESCRIPTION OF THE DRAWINGS

In order to more fully understand the present invention, reference is made to the accompanying drawings in which.

DETAILED DESCRIPTION OF THE PREFERRED EMBODIMENT

The present invention is directed to reducing power consumption of the charging inputs in low-power circuits.

This patent application is related to and incorporates by reference the subject matter of commonly owned and assigned co-pending U.S. patent application Ser. No. 08/427,031 entitled "Method For Reducing Power Consumption Of Switching Nodes In A Circuit", filed Apr. 24, 1995,1995, by Alexander Saldanha, Patrick McGeer, and Luciano Lavagno, which is directed towards a method for deriving circuits from Shannon graphs which reduces the number of transitions occurring on gates therein which do not propagate to the output so as to reduce overall power consumption.

It should be understood that one considered skilled in this art would readily understand digital logic and digital circuit components and their functionality, concepts underlying a Shannon graph and concepts underlying a Binary Decision Diagram (BDD). See, "Graph-Based Algorithms for Boolean Function Manipulation", by Randal Bryant, *IEEE Transactions on Computers*, Vol. C-35, No. 8, pp. 677–691, (Aug. 1986), [IEEE 0018-9340/86/0800-0677], incorporated herein by reference.

The presently disclosed invention is preferably applied after well-known decomposition and area recovery techniques are performed on an initial circuit derived from a Shannon graph. These techniques are well-known in the arts and a discussion directed to the specifics is omitted herein. The well-known Huffman algorithm for decomposition is discussed in: "A Method for the Construction of Minimum Redundancy Codes", by D. A. Huffman, in *Proceedings of the IRE*, Vol. 40, pps. 1098–1101, (September 1952). An application of the Huffman algorithm to the field of power optimization is disclosed in "Decomposition for Minimum Transition Activity", by R. Murgai, et al. cited previously.

Shannon Graphs

A Shannon graph is a graphical representation of a function and can be defined more formally by the recursive expansion of the following formula:

$$f = x \wedge f(x=1) \vee x' \wedge f(x=0) \qquad (1)$$

Figure 1A:
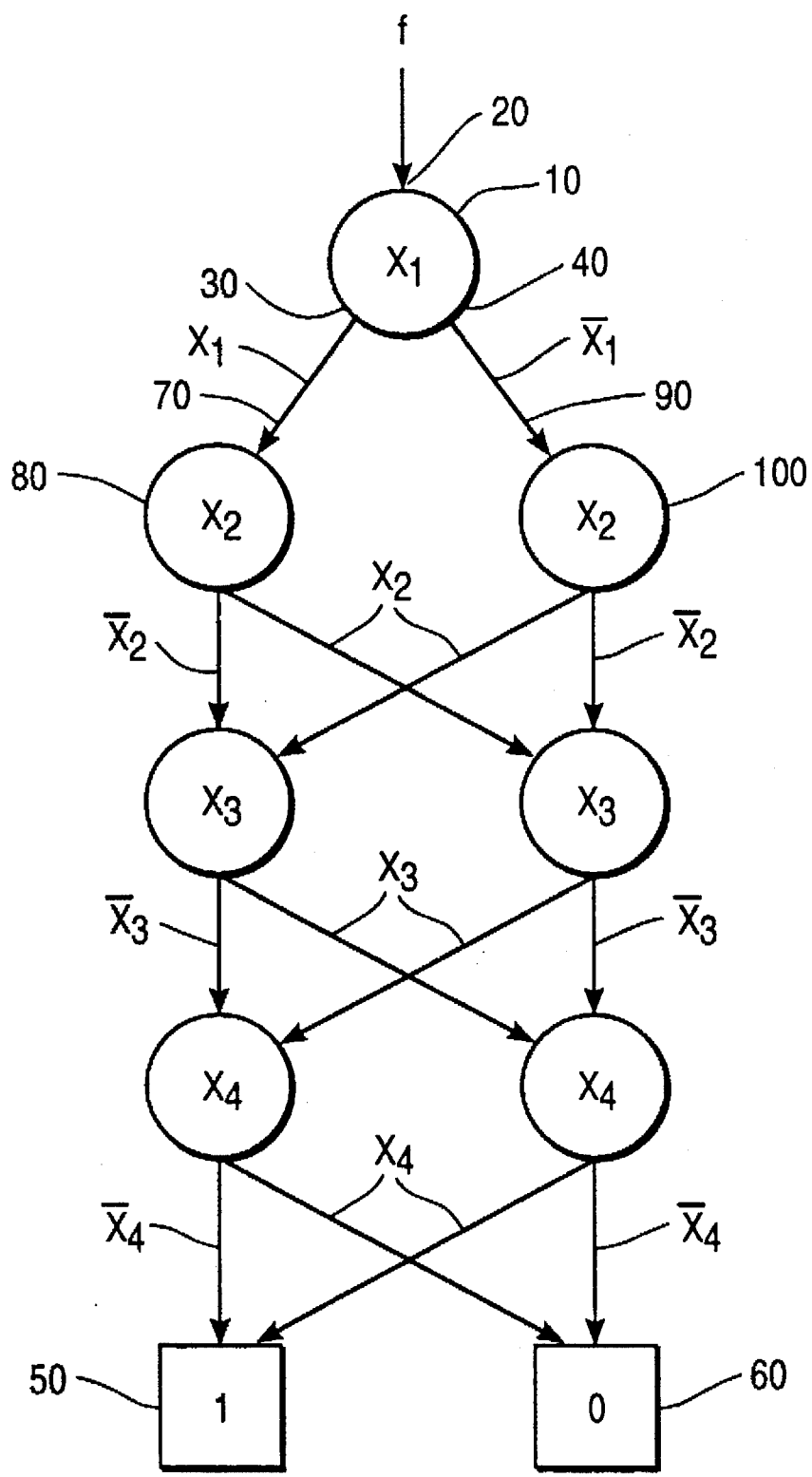
FIG. 1a and 1b illustrate typical Shannon graphs.

The present invention takes as its starting point a Shannon graph defined recursively by the following properties, with illustrative reference to FIG. 1a:

1. Nodes labeled 1 and 0 are end-terminals, labeled 50 and 60. Either the one end-terminal 50 or the zero end-terminal 60 will be reached, depending on path traversed in the Shannon graph; and
2. A graph of a non-constant function f is a rooted, labeled, binary, directed, acyclic graph with a root node having the following sub-properties:
    i. The out-degree of a root node of the Shannon graph is two, labeled output edges 30 and 40;
    ii. One of the output edges of the root node is labeled x, and the other output edge is labeled x', where x is any variable such that f(x) is not equal to f(x'). This is illustrated by output edges 30 and 40, respectively;
    iii. The output edge x is attached to the input edge of a root node of a Shannon graph for f(x), 70 and node 80; and
    iv. The output edge x' is attached to the input edge of a root node of a Shannon graph for f(x'), 90 and node 100.

If no two nodes in a Shannon graph of f are roots of Shannon graphs of identical functions, a Shannon graph of f is said to be "reduced". A special case of the reduced Shannon graph is that of a binary decision diagram (BDD) which has the property that no path through the reduced Shannon graph contains two distinct edges with the same label. The Shannon graph in FIG. 1 illustrates a BDD.

By convention, the output edge labeled $x_i$ from the node $X_i$ corresponds to the edge traversed if $x_i$ evaluates to 1, and the output edge $x'_i$ corresponds to the edge traversed if $x_i$ evaluates to 0. The same convention and representation is used herein to label a node's output edges and represent the states of the respective output edges.

The user who designs the Shannon graph pre-defines the functions such that the graph produces the desired output states, depending on the values for primary input leads (also known as input vectors). From a circuit derived from such a graph, the present invention derives low-power circuits. Alternatively, the present invention derives low-power circuits from a circuit in which all the gates either transition from a 0 to a 1, or from a 1 to a zero.

SYSTEM CONFIGURATION

Figure 2:
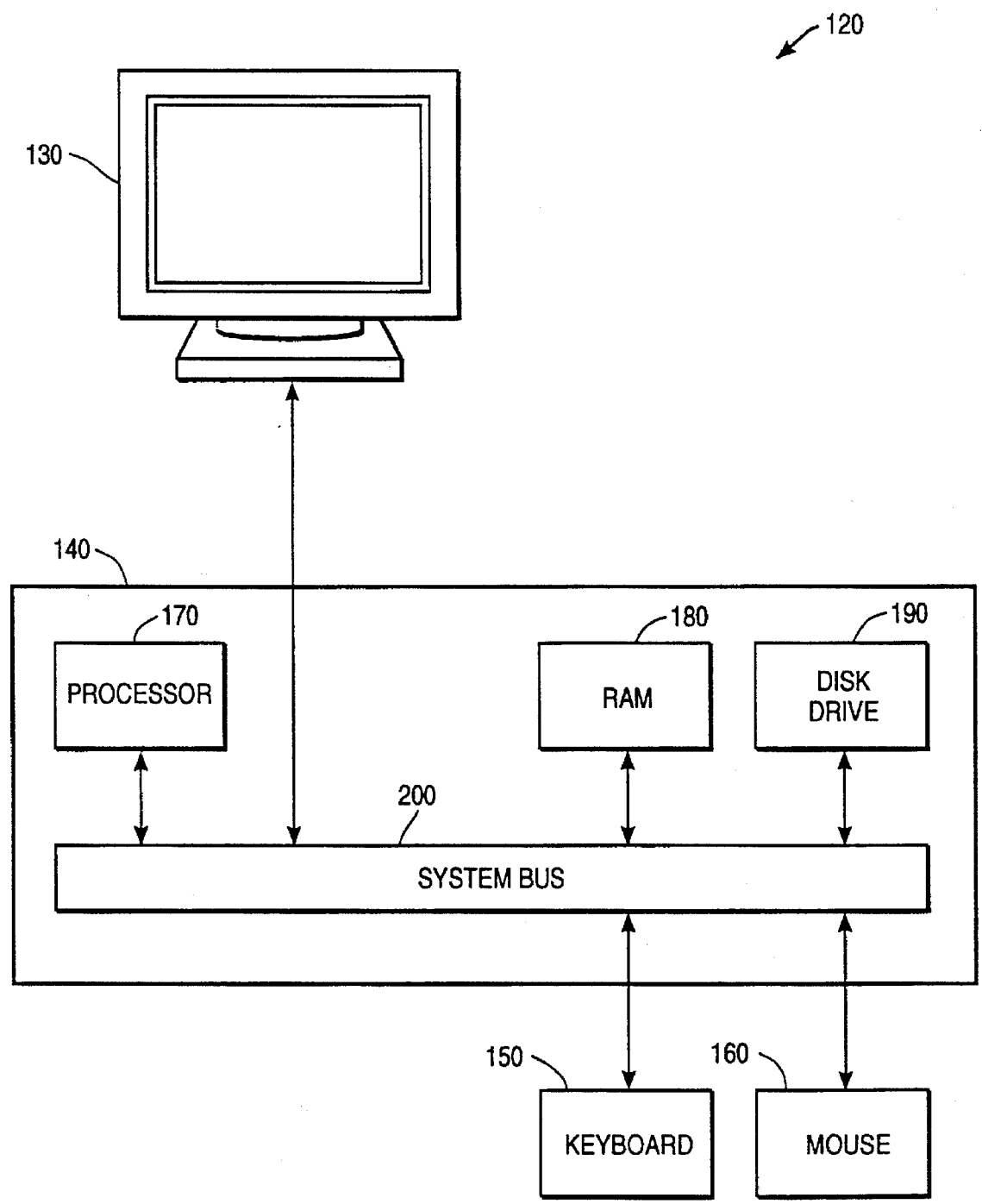
FIG. 2 is a block diagram of a system according to a preferred embodiment of the present invention.

FIG. 2 is a block diagram of a system 120 according to a preferred embodiment of the present invention. System 120 includes a display monitor 130, a computer 140, a keyboard 150, and a mouse 160. Computer 140 includes familiar computer components such as a processor 170, and memory storage devices such as a random access memory (RAM) 180, a disk drive 190, and a system bus 200 interconnecting the above components. In a preferred embodiment, System 120 includes a SPARC-10, 40 MegaHertz based computer, running the UNIX operating system, both from Sun Microsystems, and a low power synthesis module which is part of the Sequential Interactive System (SIS) software available from University of California, Berkeley.

FIG. 2 is representative of but one type of computer system for embodying the present invention. It will be readily apparent to one of ordinary skill in the art that many computer system types and configurations are suitable for use in conjunction with the present invention.

POWER CONSIDERATIONS

A two-input gate realization is utilized herein for estimating power consumption of a circuit. The power consumed by a transition on a particular gate output is directly proportional to the fan-out of that gate, for example, the power consumed by a transition on a gate with a fan-out of number n and the power consumed per gate is P is n*P power. With regard to a Shannon graph, if M denotes the largest fan-in of a node in the Shannon graph, an OR-gate with M inputs for example can be decomposed into a balanced-binary tree of two input OR-gates, thereby yielding an OR-Tree of depth at most $\log_2 M$. For a Shannon graph with n inputs and m output circuits, at most nm AND-gates and nm($\log_2 M$) OR-gates can become active when enabled. In the circuit derived from the Shannon graph in the related application and used herein, the circuit is enabled when an ENABLE signal is set to 1, and gates rise to a 1 state. When reset, ENABLE=0, these same gates fall, i.e., return to a 0 state. On a full ENABLE cycle, at most 2 nm(1+$\log_2$(M)) gate transitions occurs.

In order to increase the power savings realized by the derived circuit of the related patent application, the power expended when the primary inputs change, as just described above, needs to be accounted for. In the worse case, for each input change, a transistor on every AND-gate in the circuit either charges or discharges. Since, according to the related patent application, there exists one AND-gate per edge in the starting graph and two output edges per node, the power consumed by two AND gates needs be accounted for. The worst case total power consumption is:

$$P_{total} = 2 \text{ nm}(1+\log_2(M))P + 2|E|P \qquad (2)$$

|E| is the total number of output edges in the BDD, and P is the power consumed by a single transition on a gate having a single fan-out.

Applying the well-known technique of node duplication with balanced tree decomposition for an OR-gate, at an end-terminal of the above circuit, yields a second upper bound for the total power consumption:

$$P_{total} = 4 \text{ nmP} + 2|E|P \qquad (3)$$

As stated previously, the problem herein is that, on each change in a given primary input lead $x_i$, AND-gates associated with primary input lead $x_i$ must also change. In the instance wherein the number k of AND gates associated with $x_i$ is relatively large this may constitute a significant drain on overall circuit power. The second term of equations (2) and (3) for total power tends to dominate in computation of total power consumption when the number of edges |E| is much larger than the number of primary input leads n, i.e. |E|>>n. It is readily apparent to those skilled in the art that |E|≤2ⁿ. In such a situation, the power expended when the primary input leads charge up must also be taken into account. The present invention is directed towards this end and achieves this objective by applying what is referred herein to as a dominator selection circuit.

Determining mean power consumption of the circuit in response to an input vector, requires knowledge of the switching probabilities of the various nodes of the selected network. As will be used herein, the term "1-controllability" of a primary input lead is the probability that a primary input lead will be set or switched to one; symbolically, $p(x_i=1)$. Two sets of probabilities are of interest:

1. The probability that a primary input lead $x_i$ will switch, denoted $P_i$, is given by $P_i=2p(x_i=1)(1-p(x_i=n))$.
2. The probability that an internal gate will switch to 1, 1-controllability", denoted $p_g$ is given by:
   (i) The 1-controllability of the ENABLE input, p enable is 1;
   (ii) The 1-controllability of the output of an AND gate is equal to the product of the 1-controllability of its inputs, $p_{AND}=p_{input1} * p_{input2}$; and
   (iii) The 1-controllability of the output of an OR gate is equal to the sum of the 1-controllability of its inputs, $P_{OR}=p_{input1}+p_{input2}$.

DOMINATOR SELECTION CIRCUIT

In the preferred embodiment of the present invention, a dominator selection circuit is constructed and associated with each selected primary input lead. An edge e in a Shannon Circuit is said to dominate a gate g if the edge e precedes gate g on every path that starts from an ENABLE signal and contains gate g. Likewise, an edge $e_1$ in a Shannon Circuit is said to dominate an edge $e_2$ if the edge $e_1$ precedes edge $e_2$ on every path that starts from an ENABLE signal and contains edge $e_2$. A selection circuit is then constructed in conjunction each dominator edge, each dominated edge, and each selected primary input lead, where applicable.

In operation, the input pins of dominated gates g need not be set, i.e. charged by primary input leads $x_i$ or $x'_i$, to their correct values unless and until the dominator edge e becomes active. In a timed Shannon Circuit, each gate can only transition from 0 to 1. Further, an AND gate can only transition from 0 to 1 if both inputs are 1, in particular, the internal lead (not from a primary input lead) must be 1. Thus, the internal lead can only be 1 if the dominator edge is 1. As will be shown, these dominator selection circuits are utilized to reduce the power consumption due to the fan-out of the primary input leads.

Figure 3:
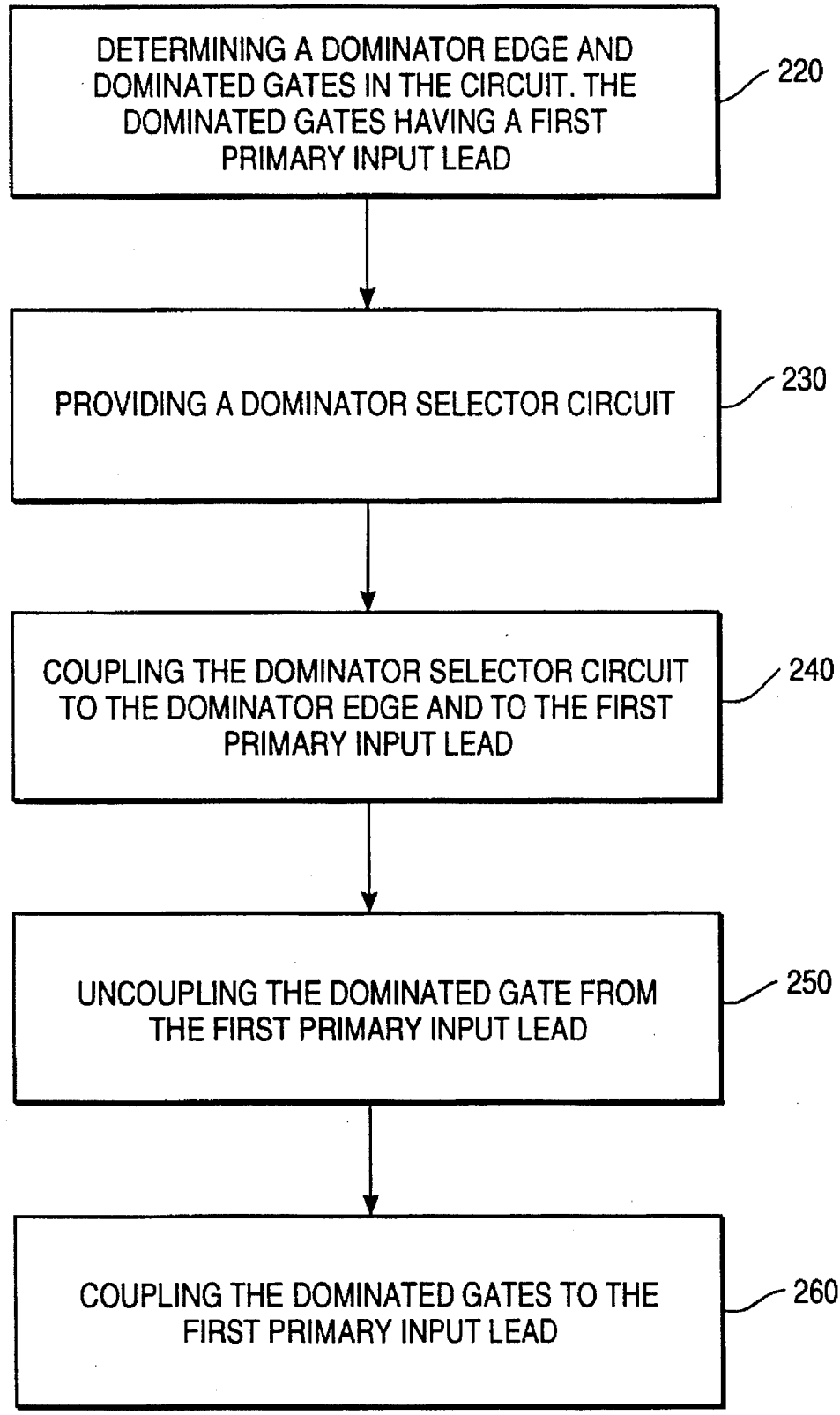
FIG. 3 illustrates a flow diagram of one embodiment of the process of reducing the power consumed by the charging of primary input leads into a circuit.

FIG. 3 illustrates a flow diagram of one embodiment of the process of reducing the power consumed by the charging of primary input leads into a circuit.

In the preferred embodiment of the present invention, given a circuit preferably derived from a Shannon graph, dominator edges, dominated edges, and dominated gates are determined, step 220. The dominated gates are associated with a first primary input lead, i.e. have the first primary input lead as an input. Further description of dominator edges is given in conjunction with the following example, illustrated in FIGS. 1b, 4 and 5.

In the next step, a dominator selector circuit, preferably an AND gate is inserted into the circuit, step 230. The inputs of the dominator selector are then coupled to the dominator edge and the first primary input lead, step 240. Next, the first primary input lead is uncoupled from the dominated gates, step 250, and the output of the AND gate is coupled to the dominated gate, and 260. These steps are illustrated in the following example.

EXAMPLE

Figure 1B:
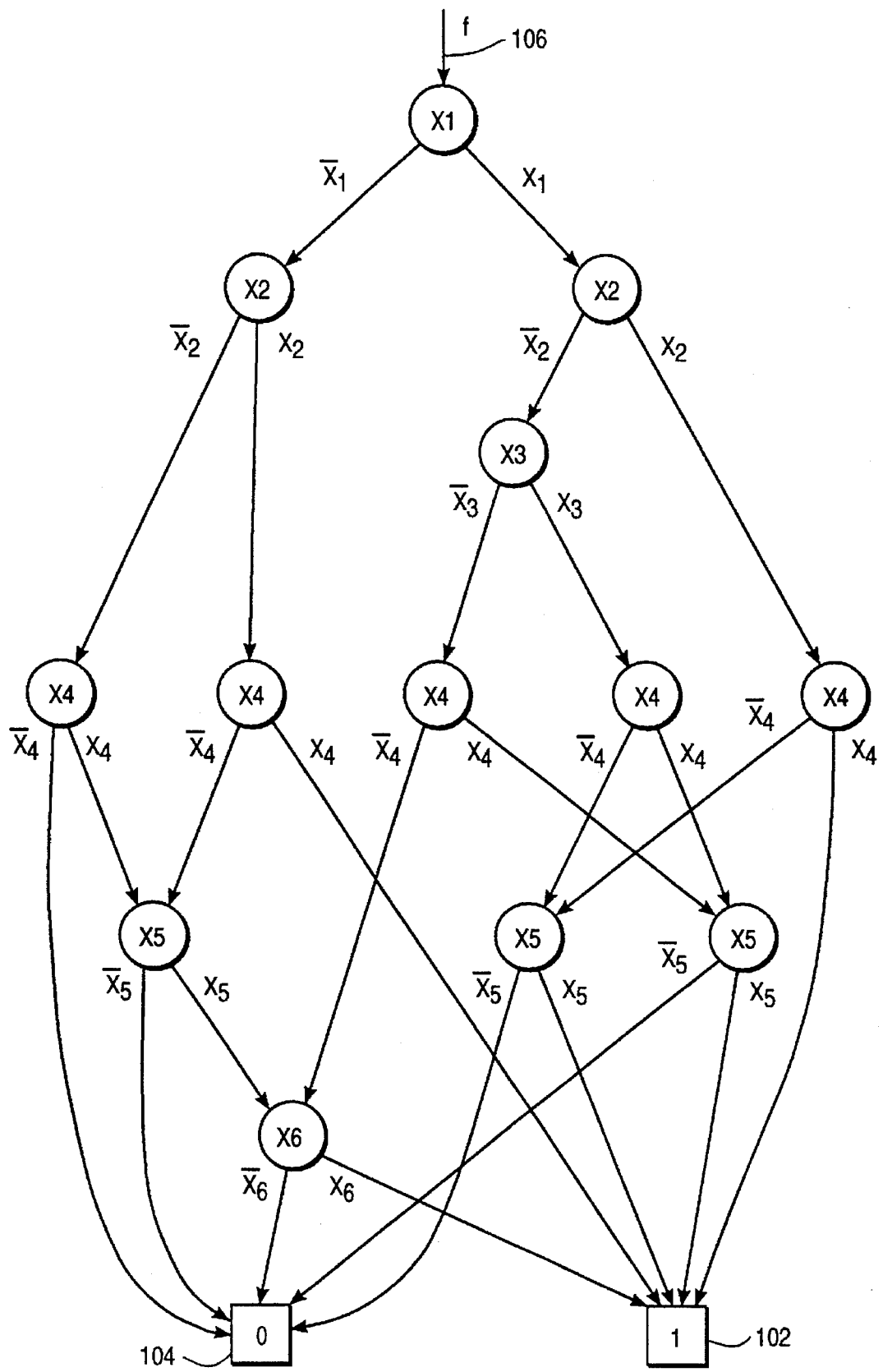
Figure 4:
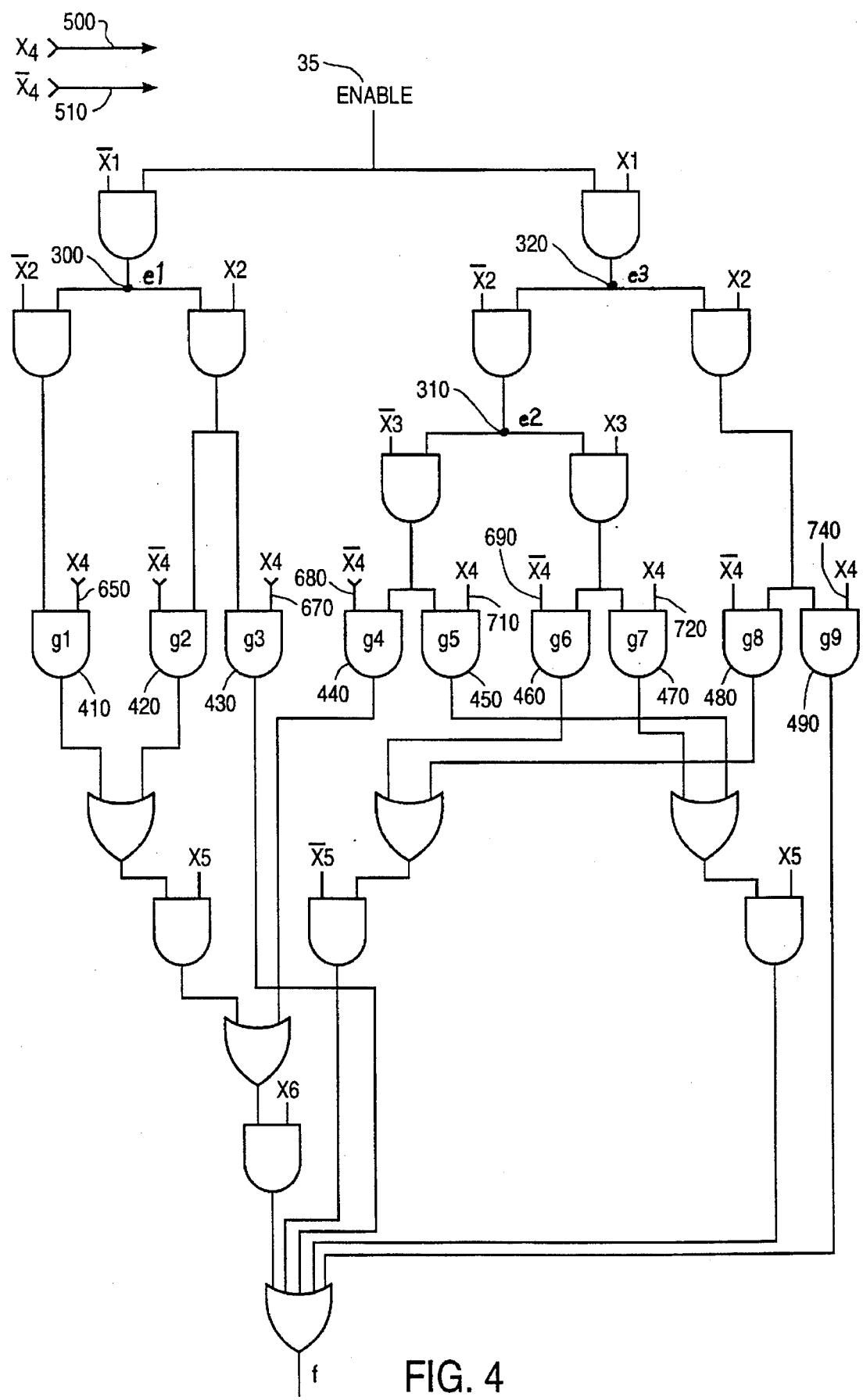
FIG. 4 illustrates a circuit derived from the Shannon graph in FIG. 1b, using the techniques disclosed in the cited related patent application.
Figure 5:
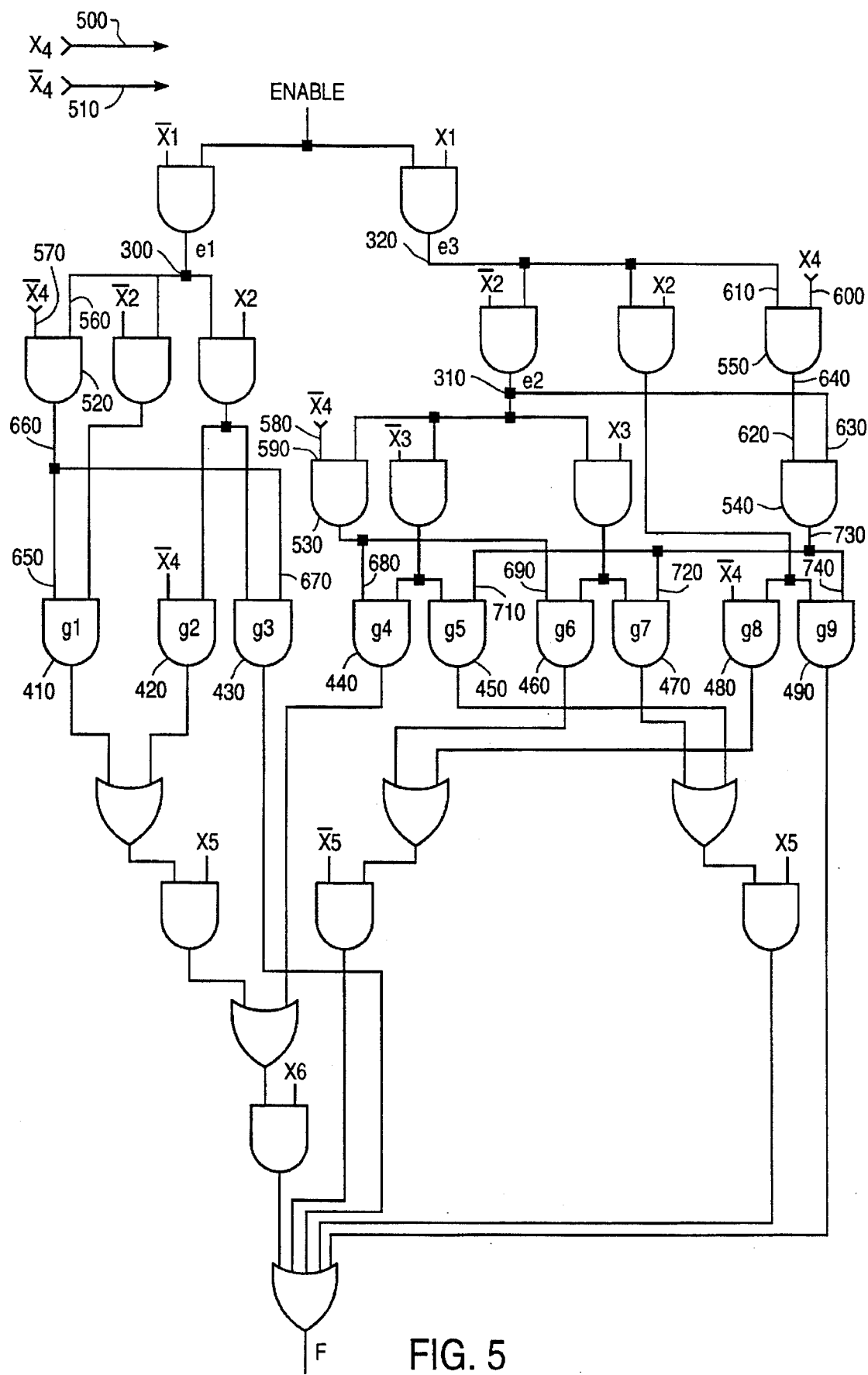
FIG. 5 illustrates the circuit derived from the circuit in FIG. 4 using the techniques disclosed herein.

FIG. 4 illustrates a circuit derived from the Shannon graph in FIG. 1b, using the techniques disclosed in the cited related patent application. $x_i$ and $x'_i$ represent primary input leads into the circuit. FIG. 5 illustrates the circuit derived from the circuit in FIG. 4 using the techniques disclosed herein.

The first step of the preferred embodiment involves identifying the dominator edges, step 220. The dominator edges are obtained by performing a traversal of the circuit, in reverse, levelized topological order, from end terminals 102 and 104 towards an Enable signal 106. Such an identification method can be found in the literature using the well-known data structure call a priority queue. See, *The Design and Analysis of Computer Algorithms* by A. V. Aho, J. E. Hopcroft, and J. D. Ullman, Addison Wesley, 1974. The method for finding all the dominators of a gate is linear in the size of the initial starting circuit. Thus, specifics as to dominator identification are omitted.

Dominator edges are illustrated in FIG. 4. In FIG. 4, edge e1, 300 is said to dominate gates g1, 410 and g3, 430 because e1 precedes both g1 and g3, and because both g1 and g3 have the same primary input lead x4, 500. Edge e2, 310 is said to dominate gates g5, 450 and g7, 470 because edge e2 precedes both g5 and g7, and because both g5 and g7 have the same primary input lead x4, 500. Edge e2, 310 is also said to dominate gates g4, 440 and g6, 460 because edge e2 precedes both g4 and g6, and because both g4 and g6 have the same primary input lead x4', 510. Further, edge e3, 320 is said to dominate gates g5, 450, g7, 470, and g9, 490, and because g5, g7 and g9, all have the same primary input lead x4 and, edge e3, 320 is said to dominate gates g4, 440, g6, 460, and g8, 480. Note, g8, 480, is also dominated by e3, 320 along with g4 and g6; however, this fact is not used in this example for sake of clarity.

Once the dominator edges have been identified, the next step in the preferred embodiment is to add an AND gate to the circuit, step 230, for each dominator gate in the circuit. In FIG. 5, this is illustrated by the inclusion of AND gate 520 for dominator edge e1, 300, AND gates 530 and 540 for dominator edge e2, 310, and gate 550 for dominator edge e3, 320.

The inputs into AND gates 520–530 are then coupled to the respective dominator edge e, and to the respective primary input leads, $x_i$ or $x'_i$, steps 240 and 250. FIG. 5 illustrates the inputs 560 and 570 to AND gate 520 are coupled to primary input lead $x_4$, 500, and to dominator edge e1, 300, respectively. AND gate 520 is coupled to primary input lead x4, 500 because, the dominated gates g1 410 and g2 420 take primary input lead x4, 500 as an input. As further illustrated, the inputs 580 and 590 to AND gate 530 are coupled to primary input lead x4', 510 and to dominator edge e2, 310, respectively.

If a set of gates has multiple dominator edges, the inserted AND gates may be connected in chain-like fashion to obtain further power reductions. In FIG. 4, gates g5, 450, g7, 470, and g9, 490, are each coupled to primary input lead x4, 500, gates g5, 450, g7, 470, are dominated by both dominator edges e2, 310, and e3, 320, and gate g9, 490 is dominated by only dominator edge e3, 320.

The conflict between multiple dominator edges viz the gates g can be resolved in two ways. In the first way, illustrated in FIG. 5, the inputs 600 and 610 to AND gate 550 are coupled to primary input lead x4, 500 and to dominator edge e3, 320, respectively, and the inputs 620 and 630 to AND gate 540 are coupled to the output 640 of AND gate 550 and to dominator edge e2, 310, respectively. In an alternative embodiment, AND gate 540 can be entirely dispensed with, i.e., replaced by a direct connection between the output 640 of gate 550 and node 730, thus only dominator edge e3 is utilized for reducing power consumption in gates g5, 450 and g7, 470 in this alternative embodiment. The former embodiment is preferred because the probability, also known as 1-controllability, that dominator edge e2 will switch compared to the probability (1-controllability) that dominator edge e3 will switch is virtually always lower. The term "1-controllability" is the probability that the edge will switched from zero to one, and calculation of the 1-controllability is well known in the art. Because dominator edge e2 switches less than dominator edge e3, primary input lead x4, 500 does not need to charge the inputs to gates g5, 450, and g7, 470 as often as the inputs to gate g9, 490, thus saving power.

The next steps, steps 260 and 270, require uncoupling the primary input leads from the input edges of the dominated gates and coupling the input edges with the outputs of the respective AND gates. This is illustrated by comparing FIGS. 4 and 5. In FIG. 4, input 650 of gate g1, 410 is coupled to primary input lead x4, 500, whereas in FIG. 5, input 650 is coupled to the output 660 of AND gate 520. Similarly, input 670 of gate g3, 430 is initially coupled to primary input lead x4, 500, whereas in FIG. 5, input 670 is coupled to the output 660 of AND gate 520. This is repeated for inputs 680 and 690 for gates g4, 440, g6, 460, respectively, and output 700 of AND gate 530. Further, the inputs 710 and 720 for gates g5, 450, g7, 470, respectively, are coupled to output 730 of AND gate 540, and the input 740 for gate g9, 490 is coupled to output 640 of AND gate 550.

The power saving resulting from an application of the dominator selection circuit of the present invention is due to the fact that in general dominator edges are inactive, or OFF, most of the time. If the probability of switching for any given primary input xi is denoted $p_i$, then the expected unbuffered power consumption to charge k number of gates can be given as $p_i kP$. The probability of a dominator gate g of those k gates being evaluated to one, $p_g$, is derived as follows. If a primary input lead xi must charge only one gate input, for example the inserted AND gate input, and the AND gate has a fan out of number k, the AND gate has a transition probability of $p_i p_g$, and the total transition power consumed is $p_i p_g (kP)$. The increase in fanout accounts for the additional power $p_g P$. Recalling that ENABLE signal is set to high and low for each set of primary input leads, for each input vector, the total buffered power consumed is:

$$p_i P + 2p_g(p_i k+1)P \qquad (4)$$

It follows that power is saved when:

$$p_i kP > p_i P + 2p_g(p_i k + 1)P \qquad (5)$$

or $$\frac{p_i(k-1)}{2(p_i k+1)} > p_g \qquad (6)$$

This expression is evaluated for each dominator gate to determine whether it is worth buffering. While the exact value of $p_g$ at which it is worth buffering is dependent upon the constants in equation (6), asymptotically:

$$\lim_{k \to \infty} \left[ \frac{p_i(k-1)}{2(p_i k+1)} \right] = 0.5 \qquad (7)$$

Since the left hand side of equation (7) is monotonic for k>0, it can be concluded that except when the dominator is the root, it is almost always worth buffering when a dominator gate exists and k>1.

Lastly, it is often the case that a node in a graph has only one dominator edge (the root) which is relatively useless for power reduction. In this instance, the dominator selection can still be performed using a dominator set. A dominator set is a simple set of edges in the Shannon graph such that each path to the node must pass through one edge in the set. In the case where a dominator set is chosen, the edges of the set are OR'ed together to form the input.

It will be appreciated by those skilled in this particular art that the present invention can be embodied in other specific forms without departing from the spirit or essential characteristics thereof. In particular, since circuit designers of the present day design most, if not all, of their circuits on computers before reducing their designs to hardware, it is envisioned herein that the present invention will find its implementation in an electronic design automation software program embedded within a computer system. Such an embodiment is therefore to be considered within the scope of the present invention. The scope of the invention is therefore indicated by the appended claims rather than the foregoing description and all changes that come within the meaning and range of equivalents thereof are intended to be considered as being embraced within their scope.

What is desired to be secured by United States Letters Patents is:

1. A method for reducing power consumed in a circuit, the circuit having at least a first and a second primary input lead, a plurality of gates, and a plurality of edges, the method comprising the steps of:

determining a dominator edge and dominated gates in the circuit, the dominated gates coupled to the first primary input lead and to edges of the plurality of edges dominated by the dominator edge;

providing a dominator selector circuit to the circuit;

coupling the dominator selector circuit to the dominator edge and to the first primary input lead;

uncoupling the dominated gates from the first primary input lead; and coupling the dominated gates to the dominator selector circuit.

2. The method of claim 1, wherein the dominated gates each have at least a first input and a second input, the first inputs of the dominated gates coupled to the first primary input lead, the second inputs of the dominated gates coupled to edges of the plurality of edges dominated by the dominator edge;

wherein the dominator selector circuit has at least a first and a second input and an output;

wherein the step of coupling the dominator selector circuit comprises the steps of:
      coupling the first input of the dominator selector circuit to the dominator edge; and
      coupling the second input of the dominator selector circuit to the first primary input lead;

wherein the step of uncoupling comprises uncoupling the first inputs of the dominated gates from the first primary input lead; and wherein the step of coupling the dominated gates comprises coupling the first inputs of the dominated gates to the output of the dominator selector circuit.

3. The method of claim 1 wherein, the dominator selector circuit is an AND gate.

4. A circuit produced in accordance with the process of claim 1.

5. The method of claim 1, wherein the step of determining a dominator edge and dominated gates comprises the steps of:

determining a dominator set of edges and the set of dominated gates; and determining the dominator edge in response to the dominator set of edges.

6. The method of claim 5, wherein the step of determining the dominator edge in response to the dominator set comprises ORing the dominator set of edges together.

7. A method for reducing power consumed in a circuit, the circuit having at least a first and a second primary input lead, a plurality of gates, and a plurality of edges, the method comprising the steps of:

determining a first dominator edge and a first set of dominated gates in the circuit, the first set of dominated gates coupled to the first primary input lead and to a first set edges of the plurality of edges dominated by the first dominator edge;

determining a second dominator edge and a second set of dominated gates in the circuit, the second set of dominated gates coupled to the first primary input lead and to a second set of edges of the plurality of edges dominated by the second dominator edge;

determining a third set of dominated gates, the third set of dominated gates including gates dominated by only the first dominator edge;

determining a fourth set of dominated gates, the fourth set of dominated gates including gates dominated by the first dominator edge and the second dominator edge;

providing a first dominator selector circuit to the circuit;

providing a second dominator selector circuit to the circuit;

coupling the first dominator selector circuit to the first dominator edge and to the first primary input lead;

coupling the second dominator selector circuit to the second dominator edge and to the first dominator selector circuit;

uncoupling the first primary input lead from the first set of dominated gates;

coupling the third set of dominated gates to the first dominator selector circuit; and coupling the fourth set of dominated gates to the second dominator selector circuit.

8. The method of claim 7, wherein the first set of dominated gates each have a first input and a second input, the first inputs of the first set of dominated gates coupled to the first primary input lead, the second inputs of the first set of dominated gates coupled to edges of the plurality of edges dominated by the first dominator edge;

wherein the second set of dominated gates each have a first input and a second input, the first inputs of the second set of dominated gates coupled to the first primary input lead, the second inputs of the second set of dominated gates coupled to edges of the plurality of edges dominated by the second dominator edge;

wherein the first dominator selector circuit has at least a first and a second input and an output;

wherein the second dominator selector circuit has at least a first and a second input and an output;

wherein the step of coupling the first dominator selector circuit comprises steps of:

coupling the first input of the first dominator selector circuit to the first dominator edge; and coupling the second input of the first dominator selector circuit to the first primary input lead;

wherein the step of coupling the second dominator selector circuit comprises; the steps of:

coupling the first input of the second dominator selector circuit to the second dominator edge; and coupling the second input of the second dominator selector circuit to the output of the first dominator selector circuit;

wherein the step of uncoupling comprises uncoupling the first inputs of the first set of dominated gates from the first primary input lead;

wherein the step of coupling the third set of gates comprises coupling first inputs of the third set of dominated gates to the output of the first dominator selector circuit; and wherein the step of coupling the fourth set of gates comprises coupling first inputs of the fourth set of dominated gates to the output of the second dominator selector circuit.

9. The method of claim 7 wherein, the first dominator selector circuit and the second dominator selector circuit are AND gates.

10. A circuit produced in accordance with the process of claim 7.

11. The method of claim 7, wherein the step of determining a second dominator edge and a second set of dominated gates comprises the steps of:

determining a dominator set of edges and the second set of dominated gates; and

ORing the dominator set of edges together to determine the second dominator edge.

12. A method for reducing power consumed in a circuit, the circuit having at least a first and a second primary input lead, a plurality of gates, and a plurality of edges, the method comprising the steps of:

determining a first dominator edge and a first set of dominated gates in the circuit, the first set of dominated gates each having a first input and a second input, the first inputs of the first set of dominated gates coupled to the first primary input lead, the second inputs of the first set of dominated gates coupled to edges of the plurality of edges dominated by the first dominator edge;

determining a second dominator edge and a second set of dominated gates in the circuit, the second set of dominated gates each having a first input and a second input, the first inputs of the second set of dominated gates coupled to the first primary input lead, the second inputs of the second set of dominated gates coupled to edges of the plurality of edges dominated by the second dominator edge, the second set of dominated gates being a subset of the first set of dominated gates;

providing an AND gate to the circuit, the AND gate having at least a first and a second input and an output;

coupling the first input of the AND gate to the first dominator edge;

coupling the second input of the AND gate to the first primary input lead;

uncoupling the first inputs of the first set of dominated gates from the first primary input lead; and coupling the first inputs of the first set of dominated gates to the output of AND gate.

13. A circuit produced in accordance with the process of claim 12.

14. A system for reducing power consumed in a circuit, the circuit having at least a first and a second primary input lead, a plurality of gates, and a plurality of edges, the system including a processor and a memory, the system further comprising:

an input device, coupled to the memory for inputting a Shannon graph into the memory;

means, coupled to the memory for determining a dominator edge and dominated gates in the circuit, the dominated gates coupled to the first primary input lead and to edges of the plurality of edges dominated by the dominator edge;

means, coupled to the memory for providing a dominator selector circuit to the circuit;

means, coupled to the memory for coupling the dominator selector circuit to the dominator edge and to the first primary input lead;

means, coupled to the memory for uncoupling the dominated gates from the first primary input lead;

means, coupled to the memory for coupling the dominated gates to the dominator selector circuit; and an output device, coupled to the processor and to the memory for outputting; the circuit.

15. The system of claim 14, wherein the dominated gates each have at least a first input and a second input, the first inputs of the dominated gates coupled to the first primary input lead, the second inputs of the dominated gates coupled to edges of the plurality of edges dominated by the dominator edge;

wherein the dominator selector circuit has at least a first and a second input and an output;

wherein the means for coupling the dominator selector circuit comprises:

means for coupling the first input of the dominator selector circuit to the dominator edge; and means for coupling the second input of the dominator selector circuit to the first primary input lead;

wherein the means for uncoupling comprises means for uncoupling the first inputs of the dominated gates from the first primary input lead; and wherein the means for coupling the dominated gates comprises means for coupling the first inputs of the dominated gates to the output of the dominator selector circuit.

16. A system for reducing power consumed in a circuit, the circuit having at least a first and a second primary input lead, a plurality of gates, and a plurality of edges, the system including a processor and a memory, the system further comprising:

an input device, coupled to the memory for inputting a Shannon graph into the memory;

means, coupled to the memory for determining a first dominator edge and a first set of dominated gates in the circuit, the first set of dominated gates coupled to the first primary input lead and to a first set of edges of the plurality of edges dominated by the first dominator edge;

means, coupled to the memory for determining a second dominator edge and a second set of dominated gates in the circuit, the second set of dominated gates coupled to the first primary input lead and to a second set of edges of the plurality of edges dominated by the second dominator edge;

means, coupled to the memory for determining a third set of dominated gates, the third set of dominated gates including gates dominated by only the first dominator edge;

means, coupled to the memory for determining a fourth set of dominated gates, the fourth set of dominated gates including gates dominated by the first dominator edge and the second dominator edge;

means, coupled to the memory for providing a first dominator selector circuit to the circuit;

means, coupled to the memory for providing a second dominator selector circuit to the circuit;

means, coupled to the memory for coupling the first dominator selector circuit to the first dominator edge and to the first primary input lead;

means, coupled to the memory for coupling the second dominator selector circuit to the second dominator edge and to the first dominator selector circuit;

means, coupled to the memory for uncoupling the primary input lead from the first set of dominated gates;

means, coupled to the memory for coupling the third set of dominated gates to the first dominator selector circuit;

means, coupled to the memory for coupling the fourth set of dominated gates to the second dominator selector circuit; and an output device, coupled to the processor and to the memory for outputting the circuit.

17. The system of claim 16, wherein the first set of dominated gates each have a first input and a second input, the first inputs of the first set of dominated gates coupled to the first primary input lead, the second inputs of the first set of dominated gates coupled to edges Of the plurality of edges dominated by the first dominator edge;

wherein the fourth set of dominated gates each have a first input and a second input, the first inputs of the fourth set of dominated gates coupled to the first primary input lead, the second inputs of the fourth set of dominated gates coupled to edges of the plurality of edges dominated by the first dominator edge and by the second dominator edge;

wherein the first dominator selector circuit has at least a first and a second input and an output;

wherein the second dominator selector circuit has at least a first and a second input and an output;

wherein the means for coupling the first dominator selector circuit comprises:

means for coupling the first input of the first dominator selector circuit to the first dominator edge; and means for coupling the second input of the first dominator selector circuit to the first primary input lead;

wherein the means for coupling the second dominator selector circuit comprises:

means for coupling the first input of the second dominator selector circuit to the second dominator edge; and means for coupling the second input of the second dominator selector circuit to the output of the first dominator selector circuit;

wherein the means for uncoupling comprises means for uncoupling the first inputs of the first set of dominated gates from the first primary input lead;

wherein the third set of gates is a subset of the first set of gates;

wherein the fourth set of gates is a subset of the first set of gates;

wherein the means for coupling the third set of gates comprises means for coupling the first inputs of the third set of dominated gates to the output of the first dominator selector circuit; and wherein the means for coupling the fourth set of gates comprises means for coupling the first inputs of the fourth set of dominated gates to the output of the second dominator selector circuit.

18. A computer system for reducing power consumed in a circuit, the circuit having at least a first and a second primary input lead, a plurality of gates, and a plurality of edges, the computer system comprising:

a computer readable storage medium comprising:
code for accepting as input a Shannon graph;
code for determining a dominator edge and dominated gates in the circuit, the dominated gates coupled to the first primary input lead and to edges of the plurality of edges dominated by the dominator edge;
code for providing a dominator selector circuit to the circuit;
code for coupling the dominator selector circuit to the dominator edge and to the first primary input lead;
code for uncoupling the dominated gates from the first primary input lead; and
code for coupling the dominated gates to the dominator selector circuit; and a processor coupled to the computer readable storage medium for executing said codes.

19. The computer system of claim 18, wherein the dominated gates each have at least a first input and a second input, the first inputs of the dominated gates coupled to the first primary input lead, the second inputs of the dominated gates coupled to edges of the plurality of edges dominated by the dominator edge;

wherein the dominator selector circuit has at least a first and a second input and an output;

wherein the code for coupling the dominator selector circuit comprises:
code for coupling the first input of the dominator selector circuit to the dominator edge; and
code for coupling the second input of the dominator selector circuit to the first primary input lead;

wherein the code for uncoupling comprises code for uncoupling the first inputs of the dominated gates from the first primary input lead; and wherein the code for coupling the dominated gates comprises code for coupling the first inputs of the dominated gates to the output of the dominator selector circuit.

20. The computer system of claim 18 wherein, the dominator selector circuit is an AND gate.

21. A computer system for reducing power consumed in a circuit, the circuit having at least a first and a second primary input lead, a plurality of gates, and a plurality of edges, the computer system comprising:

code for accepting as input a Shannon graph;
code for determining a first dominator edge and a first set of dominated gates in the circuit, the first set of dominated gates coupled to the first primary input lead and to a first set of edges of the plurality of edges dominated by the first dominator edge;

code for determining a second dominator edge and a second set of dominated gates in the circuit, the second set of dominated gates coupled to the first primary input lead and to a second set of edges of the plurality of edges dominated by the second dominator edge;

code for determining a third set of dominated gates, the fourth set of dominated gates including gates dominated by only the first dominator edge;

code for determining a fourth set of dominated gates, the fourth set of dominated gates including gates dominated by the first dominator edge and the second dominator edge;

code for providing a first dominator selector circuit to the circuit;

code for providing a second dominator selector circuit to the circuit;

code for coupling the first dominator selector circuit to the first dominator edge and to the first primary input lead;

code for coupling the second dominator selector circuit to the second dominator edge and to the first dominator selector circuit;

code for uncoupling the primary input lead from the first set of dominated gates;

code for coupling the third set of dominated gates to the first dominator selector circuit;

code for coupling the fourth set of dominated gates to the second dominator selector circuit;

a computer readable storage medium for storing said codes; and a processor for executing said codes.

22. The computer system of claim 21, wherein the first set of dominated gates each have a first input and a second input, the first inputs of the first set of dominated gates coupled to the first primary input lead, the second inputs of the first set of dominated gates coupled to edges of the plurality of edges dominated by the first dominator edge;

wherein the fourth set of dominated gates each have a first input and a second input, the first inputs of the fourth set of dominated gates coupled to the first primary input lead, the second inputs of the fourth set of dominated gates coupled to edges of the plurality of edges dominated by the first dominator edge and by the second dominator edge;

wherein the first dominator selector circuit has at least a first and a second input and an output;

wherein the second dominator selector circuit has at least a first and a second input and an output;

wherein the code for coupling the first dominator selector circuit comprises:
code for coupling the first input of the first dominator selector circuit to the first dominator edge; and
code for coupling the second input of the first dominator selector circuit to the first primary input lead;

wherein the code for coupling the second dominator selector circuit comprises:
code for coupling the first input of the second dominator selector circuit to the second dominator edge; and
code for coupling the second input of the second dominator selector circuit to the output of the first dominator selector circuit;

wherein the code for uncoupling comprises code for uncoupling the first inputs of the first set of dominated gates from the first primary input lead;

wherein the third set of gates is a subset of the first set of gates;

wherein the fourth set of gates is a subset of the first set of gates;

wherein the code for coupling the third set of gates comprises code for coupling the first inputs of the third set of dominated gates to the output of the first dominator selector circuit; and wherein the code for coupling the fourth set of gates comprises code for coupling the first inputs of the fourth set of dominated gates to the output of the second dominator selector circuit.

23. A computer program product for reducing power consumed in a circuit, the circuit having at least a first and a second primary input lead, a plurality of gates, and a plurality of edges, the computer program product comprising:

a computer readable storage medium comprising:
code for accepting as input a Shannon graph;
code for determining a dominator edge and dominated gates in the circuit, the dominated gates coupled to the first primary input lead and to edges of the plurality of edges dominated by the dominator edge;
code for providing a dominator selector circuit to the circuit;
code for coupling the dominator selector circuit to the dominator edge and to the first primary input lead;
code for uncoupling the dominated gates from the first primary input lead; and
code for coupling the dominated gates to the dominator selector circuit.

24. The computer program product of claim 23,
wherein the dominated gates each have at least a first input and a second input, the first inputs of the dominated gates coupled to the first primary input lead, the second inputs of the dominated gates coupled to edges of the plurality of edges dominated by the dominator edge;
wherein the dominator selector circuit has at least a first and a second input and an output;
wherein the code for coupling the dominator selector circuit comprises:
code for coupling the first input of the dominator selector circuit to the dominator edge; and
code for coupling the second input of the dominator selector circuit to the first primary input lead;
wherein the code for uncoupling comprises code for uncoupling the first inputs of the dominated gates from the first primary input lead; and
wherein the code for coupling the dominated gates comprises code for coupling the first inputs of the dominated gates to the output of the dominator selector circuit.

25. The computer program product of claim 23 wherein, the dominator selector circuit is an AND gate.

26. A computer program product for reducing power consumed in a circuit, the circuit having at least a first and a second primary input lead, a plurality of gates, and a plurality of edges, the computer program product comprising:

code for accepting as input a Shannon graph;
code for determining a first dominator edge and a first set of dominated gates in the circuit, the first set of dominated gates coupled to the first primary input lead and to a first set of edges of the plurality of edges dominated by the first dominator edge;
code for determining a second dominator edge and a second set of dominated gates in the circuit, the second set of dominated gates coupled to the first primary input lead and to a second set of edges of the plurality of edges dominated by the second dominator edge;
code for determining a third set of dominated gates, the fourth set of dominated gates including gates dominated by only the first dominator edge;
code for determining a fourth set of dominated gates, the fourth set of dominated gates including gates dominated by the first dominator edge and the second dominator edge;
code for providing a first dominator selector circuit to the circuit;
code for providing a second dominator selector circuit to the circuit;
code for coupling the first dominator selector circuit to the first dominator edge and to the first primary input lead;
code for coupling the second dominator selector circuit to the second dominator edge and to the first dominator selector circuit;
code for uncoupling the primary input lend from the first set of dominated gates;
code for coupling the third set of dominated gates to the first dominator selector circuit;
code for coupling the fourth set of dominated gates to the second dominator selector circuit; and
a computer readable storage medium for storing said codes.

27. The computer program product of claim 26,
wherein the first set of dominated gates each have a first input and a second input, the first inputs of the first set of dominated gates coupled to the first primary input lead, the second inputs of the first set of dominated gates coupled to edges of the plurality of edges dominated by the first dominator edge;
wherein the fourth set of dominated gates each have a first input and a second input, the first inputs of the fourth set of dominated gates coupled to the first primary input lead, the second inputs of the fourth set of dominated gates coupled to edges of the plurality of edges dominated by the second dominator edge;
wherein the first dominator selector circuit has at least a first and a second input and an output;
wherein the second dominator selector circuit has at least a first and a second input and an output;
wherein the code for coupling the first dominator selector circuit comprises:
code for coupling the first input of the first dominator selector circuit to the first dominator edge; and
code for coupling the second input of the first dominator selector circuit to the first primary input lead;
wherein the code for coupling the second dominator selector circuit comprises:

code for coupling the first input of the second dominator selector circuit to the second dominator edge; and code for coupling the second input of the second dominator selector circuit to the output of the first dominator selector circuit;

wherein the code for uncoupling comprises code for uncoupling the first inputs of the first set of dominated gates from the first primary input lead;

wherein the third set of gates is a subset of the first set of gates;

wherein the fourth set of gates is a subset of the first set of gates;

wherein the code for coupling the third set of gates comprises code for coupling the first inputs of the third set of dominated gates to the output of the first dominator selector circuit; and wherein the code for coupling the fourth set of gates comprises code for coupling the first inputs of the fourth set of dominated gates to the output of the second dominator selector circuit.

* * * * *